US008540044B2

(12) United States Patent
Ba-abbad et al.

(10) Patent No.: US 8,540,044 B2
(45) Date of Patent: Sep. 24, 2013

(54) SYSTEM AND METHOD FOR MANAGING OPERATIONS ON A PERIPHERAL SURFACE OF A BUILDING

(75) Inventors: Mazen A. Ba-abbad, Riyadh (SA); Fahad Hassan Saeed Almalki, Riyadh (SA)

(73) Assignee: King Abdulaziz City For Science and Technology (KACST), Riyadh (SA)

( * ) Notice: Subject to any disclaimer, the term of this patent is extended or adjusted under 35 U.S.C. 154(b) by 341 days.

(21) Appl. No.: 12/870,777

(22) Filed: Aug. 27, 2010

(65) Prior Publication Data

US 2012/0049012 A1 Mar. 1, 2012

(51) Int. Cl.
*B62D 63/00* (2006.01)

(52) U.S. Cl.
USPC .............................. 180/164; 182/82; 180/901

(58) Field of Classification Search
USPC .................... 180/901, 164, 9.32; 182/12, 82, 182/142, 145
See application file for complete search history.

(56) References Cited

U.S. PATENT DOCUMENTS

| | | | | |
|---|---|---|---|---|
| 3,417,832 | A * | 12/1968 | Ziccardi | 180/9.3 |
| 5,065,838 | A * | 11/1991 | Finley | 182/38 |
| 5,487,440 | A * | 1/1996 | Seemann | 180/164 |
| 6,666,299 | B2 * | 12/2003 | Cole | 182/145 |
| 8,215,435 | B2 * | 7/2012 | Dvorak | 180/164 |
| 2004/0195021 | A1 * | 10/2004 | Jeswine et al. | 180/164 |
| 2007/0163827 | A1 * | 7/2007 | Imus et al. | 180/164 |
| 2007/0235238 | A1 * | 10/2007 | Sadegh et al. | 180/164 |

* cited by examiner

*Primary Examiner* — Alvin Chin Shue
*Assistant Examiner* — Daniel Cahn
(74) *Attorney, Agent, or Firm* — Timberline Patent Law Group PLLC

(57) ABSTRACT

The invention provides a system for managing operations on a peripheral surface of a building. The system includes one or more cables wrapped around the peripheral surface of the building. Further, the system includes one or more wheeled devices capable of moving on the peripheral surface of the building. The one or more wheeled devices are operatively connected to the one or more cables. The one or more wheeled devices and the one or more cables are capable of moving on the peripheral surface of the building as an assembly. In addition, one or more instances of the assembly are operatively connected to each other.

4 Claims, 8 Drawing Sheets

SYSTEM AND METHOD FOR MANAGING OPERATIONS ON A PERIPHERAL SURFACE OF A BUILDING

FIELD OF THE INVENTION

The present invention generally relates to managing operations on a peripheral surface of a building. More specifically, the invention relates to a system for managing operations such as, fire fighting, rescue operations and maintenance operations on the peripheral surface of the building.

BACKGROUND OF THE INVENTION

Nowadays performing rescue and fire fighting operations at locations above the ground level remains tedious especially, when a location for such operations is high above the ground level. Additionally, maintenance of high rise buildings is also a time consuming and risky.

In existing technologies, helicopters are used to perform rescue and fire fighting operations on the high rise buildings. Helicopters may use one of ropes, cages, ladders, and baskets for performing rescue and fire fighting operations. However, the use of ropes, cages, ladders, and baskets involves considerable amount of risk due to the dynamics of the helicopters. Additionally, the dynamics of the helicopters results in movement of hanging cages and hanging baskets. The movement of the hanging cages and the hanging baskets may create height and space limitations.

Further, elevators may also be used to overcome the above limitations. The elevators can be installed on an exterior wall of a multi-storey building. Alternatively, the elevators may be installed in the ground level and may be used to access different stories of the building. However, the elevators have various limitations. For example, the elevators installed at the ground level cannot be used to access stories of the building that are very high above the ground level due to height limitation of the elevators. Further, the elevators installed on the exterior wall of the multi-storey building may not be able to navigate across entire peripheral surface of the multi-storey building. Further installation of such elevators may be challenging when the shape of the multi-storey building is irregular and may be costly affair. Moreover, during a severe fire outbreak, an assembly holding the elevators may get damaged.

Apart from the above mentioned technologies, suspended pulley mechanisms may be also used for rescue operations, fire fighting, and maintenance operations. The pulley mechanism may used to hold a rope along with a cage. The pulley mechanism may installed on a top portion of a high rise building thereby enabling the rope along with the cage to be suspended from the building. However, the cage suspended using the pulley mechanism may become unstable.

Therefore, there is a need for a system for managing operations on a peripheral surface of high rise buildings in an efficient manner.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
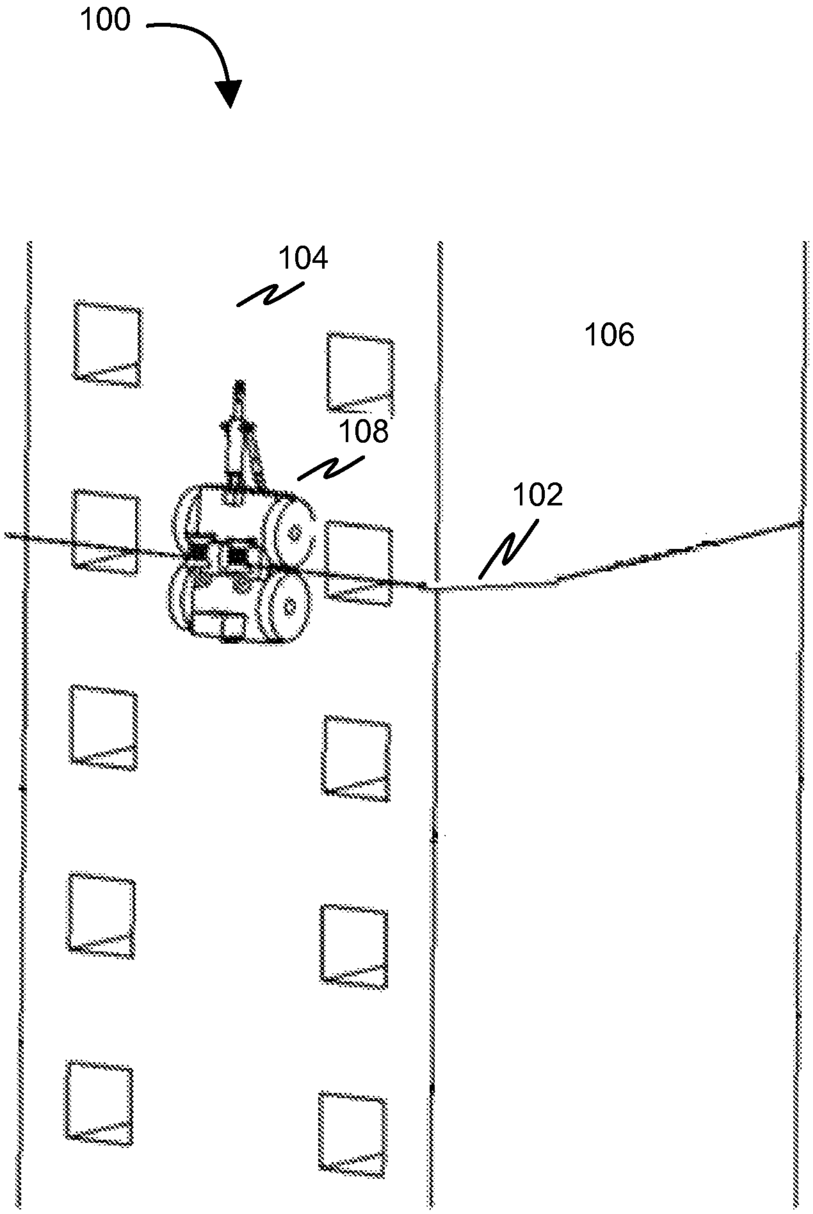
FIG. 1 illustrates a system for managing operations on a peripheral surface of a building in accordance with various embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to method and system for managing operations on a peripheral surface of a building. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide a system for managing operations on a peripheral surface of a building. The system includes one or more cables wrapped around the peripheral surface of the building. Further, the system includes one or more wheeled devices capable of moving on the peripheral surface of the building. The one or more wheeled devices are operatively connected to the one or more cables. The one or more wheeled devices and the one or more cables are capable of moving on the peripheral surface of the building as an assembly. In addition, one or more instances of the assembly are operatively connected to each other.

FIG. 1 illustrates a system for managing operations on a peripheral surface of a building in accordance with an embodiment of the invention. The system includes one or more cables wrapped around the peripheral surface of the building. The system further includes one or more wheeled devices operatively connected to the one or more cables. The one or more wheeled devices and the one or more cables are capable of moving on the peripheral surface of the building as an assembly. The system manages various operations on the building. These operations may include, for example but not limited to, firefighting operations, rescue operations, maintenance operations and cleaning operations.

For ease of description, a system 100 for managing operations on a peripheral surface of a building is shown to include a wheeled device operatively connected to a cable capable of moving as an assembly on the peripheral surface of the building in FIG. 1. However, system 100 may include multiple instances of the assembly. Further, an instance of the assembly may include one or more wheeled devices along with a one or more cables.

In system 100, a cable 102 is wrapped around a peripheral surface 104 of a building 106. Peripheral surface 104 includes the different sides of building 106. A wheeled device 108 is operatively connected to cable 102. Cable 102 enables wheeled device 108 to be securely positioned on building 106. Wheeled device 108 and cable 102 are capable of moving on peripheral surface 104 as an assembly. While moving on peripheral surface 104, cable 102 may be tightened or relaxed. This is explained in detail in conjunction with FIG. 2 and FIG. 4. The movement of wheeled device 108 is controlled by a motor (not shown in FIG. 1). More specifically, the motor operates the wheels of wheeled device 108. In an embodiment, wheeled device 108 may include a steering mechanism in order to navigate wheeled device 108 on peripheral surface 104. The steering mechanism enables wheeled device 108 to move in multiple directions for managing the operations on building 106.

Figure 2:
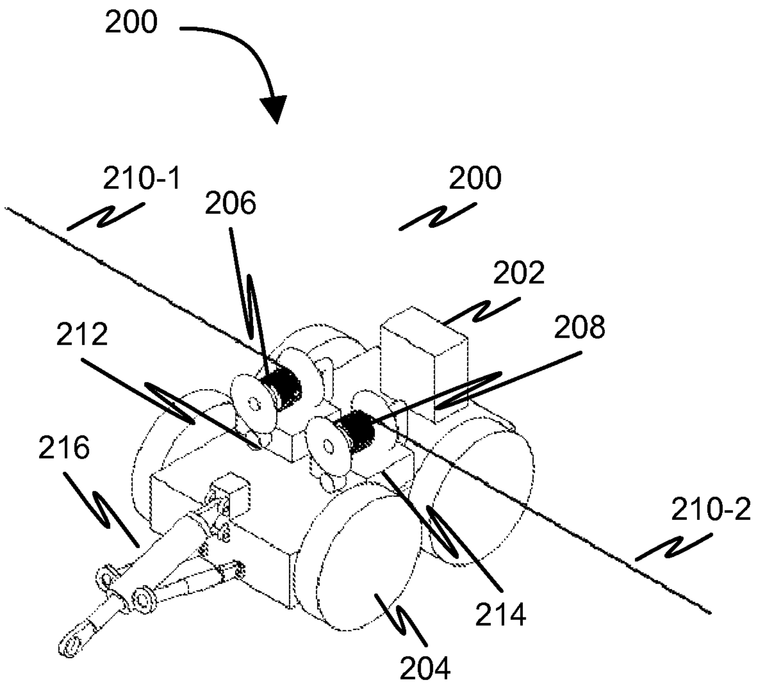
FIG. 2 illustrates a wheeled device capable of moving on a peripheral surface of a building in accordance with an embodiment of the invention.

FIG. 2 illustrates a wheeled device capable of moving on a peripheral surface of a building in accordance with an embodiment of the invention. The wheeled device includes one or more tensioning units connected to a cable of the one or more cables. Each tensioning unit of the one or more tensioning units is configured to tighten the cable of the one or more cables. The tightening of the tensioning unit is performed for tightly positioning the wheeled device on the peripheral surface of the building. Further, each tensioning unit of the one or more tensioning units is also configured to relax the cable of the one or more cables. The relaxing of the tensioning unit is performed for loosely positioning the wheeled device on the peripheral surface of the building. The tightening and relaxing of the cable of the one or more cables is controlled by a motor. In addition, the wheeled device is connected with a hydraulic pump in order to operatively connect the wheeled device with another wheeled device of an adjacent assembly. The hydraulic pump is configured to angularly move the wheeled device away from the peripheral surface of the building.

As shown in FIG. 2, wheeled device 200 is capable of moving on a peripheral surface of a building such as building 106 in accordance with an embodiment of the invention. Wheeled device 200 includes a motor 202 for controlling operation of one or more wheels such as, a wheel 204. In an embodiment, wheeled device 200 may include separate motors for controlling the operation of each wheel of the one or more wheels. Each wheel of the one or more wheels may have a surface touching the peripheral surface configured in a fashion to effectively grip wheeled device 200 onto the building.

Wheeled device 200 further includes a tensioning unit 206 and a tensioning unit 208. Tensioning unit 206 is connected to a cable 210-1 and tensioning unit 208 is connected to a cable 210-2. Tensioning unit 206 and tensioning unit 208 are configured to tighten and relax cable 210-1 and cable 210-2, respectively. Tensioning unit 206 and tensioning unit 208 are controlled by a motor 212 and a motor 214 respectively. Tensioning unit 206 and tensioning unit 208 rotates in order to tighten and relax cable 210-1 and cable 210-2, respectively. In an embodiment, a tensioning unit, such as tensioning unit 206 and tensioning unit 208 may be a reel component having a cable such as, cable 210-1 and cable 210-2 wounded thereon. In this case, the reel component may rotate to tighten or relax the cable. However, it will be apparent to a person skilled in the art that any other component known in the art may be used as a tensioning unit for tightening and relaxing the cable. Cable 210-1 and cable 210-2 are tightened to tightly position wheeled device 200 on the peripheral surface of the building. On other hand, cable 210-1 and cable 210-2 can be relaxed to loosely position wheeled device 200 on the peripheral surface of the building.

Wheeled device 200 further includes a hydraulic pump 216 in order to operatively connect wheeled device 200 to another wheeled device. Hydraulic pump 216 is operatively connected to wheeled device 200 as shown in FIG. 2. Hydraulic pump 216 is configured to angularly move with respect to wheeled device 200. For instance, wheeled device 200 may be connected to another wheeled device using hydraulic pump 216. In this case, when both these wheeled devices move on the peripheral of the building, hydraulic pump 216 may enable the wheeled device connected to wheeled device 200 to move angularly away from the peripheral surface of the building. However it will be apparent to a person skilled in the art that hydraulic pump may be connected to wheeled device 200 such as to provide multiple degrees of freedom. This function of the hydraulic pump is further explained in detail in conjunction with FIG. 4. Further, it will be apparent to a person skilled in the art that a wheeled device may be connected to another wheeled device using any other mechanism known in the art for achieving the function of the hydraulic pump.

Figure 3:
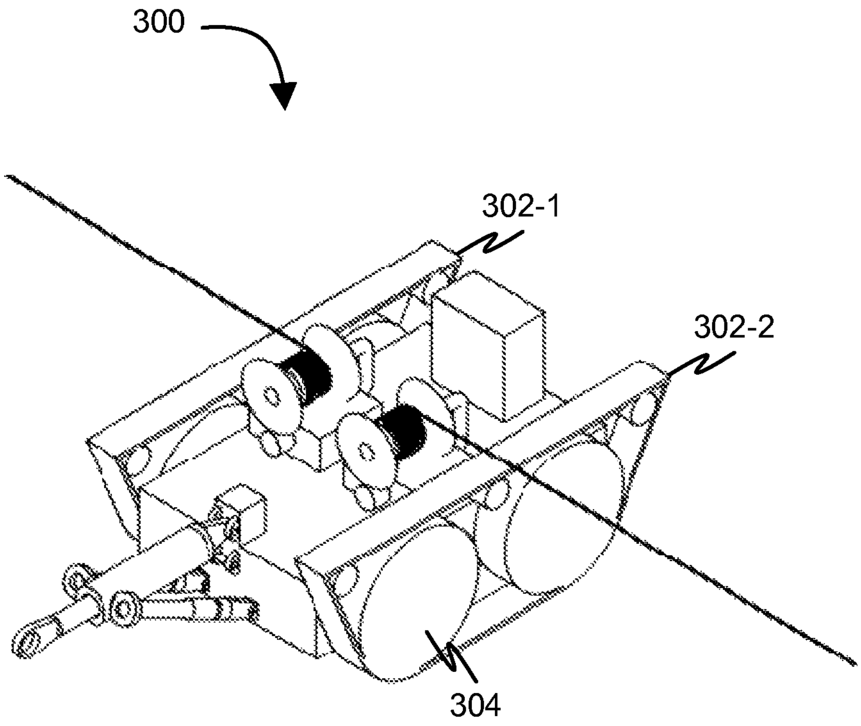
FIG. 3 illustrates a wheeled device capable of moving on the peripheral surface of the building in accordance with another embodiment of the invention.

FIG. 3 illustrates a wheeled device capable of moving on a peripheral surface of a building such as, building 106 in accordance with another embodiment of the invention. As shown in FIG. 3, a wheel device 300 includes a wheel track unit 302-1 and a wheel track unit 302-2 mounted on wheels such as, a wheel 304 of wheeled device 300. Further, wheel track unit 302-1 and wheel track unit 302-2 are configured to rotate along with the wheels of wheeled device 300 in order to move wheeled device 300 on the peripheral surface of the building. Wheel track unit 302-1 and wheel track unit 302-2 are mounted on the wheels of wheeled device 300 for enhancing the grip of wheeled device 300 on the peripheral surface of the building.

In an embodiment, a wheel track unit such as, wheel track unit 302-1 and wheel track unit 302-1 may be a belt that may be wounded around the wheels of wheeled device 300. In this case, the belt may rotate along with the wheels to move wheeled device 300 on the peripheral surface of the building. The belt may be for example, composed of but not limited to a rubber material. It will be apparent to a person skilled in the art that any other wheel track unit may be used for enabling wheeled device 300 to efficiently move on the peripheral surface of the building. Wheeled device 300 includes other components that are similar to the components present in wheeled device 200. These components and their functions are explained in detail in conjunction with FIG. 2.

Figure 4:
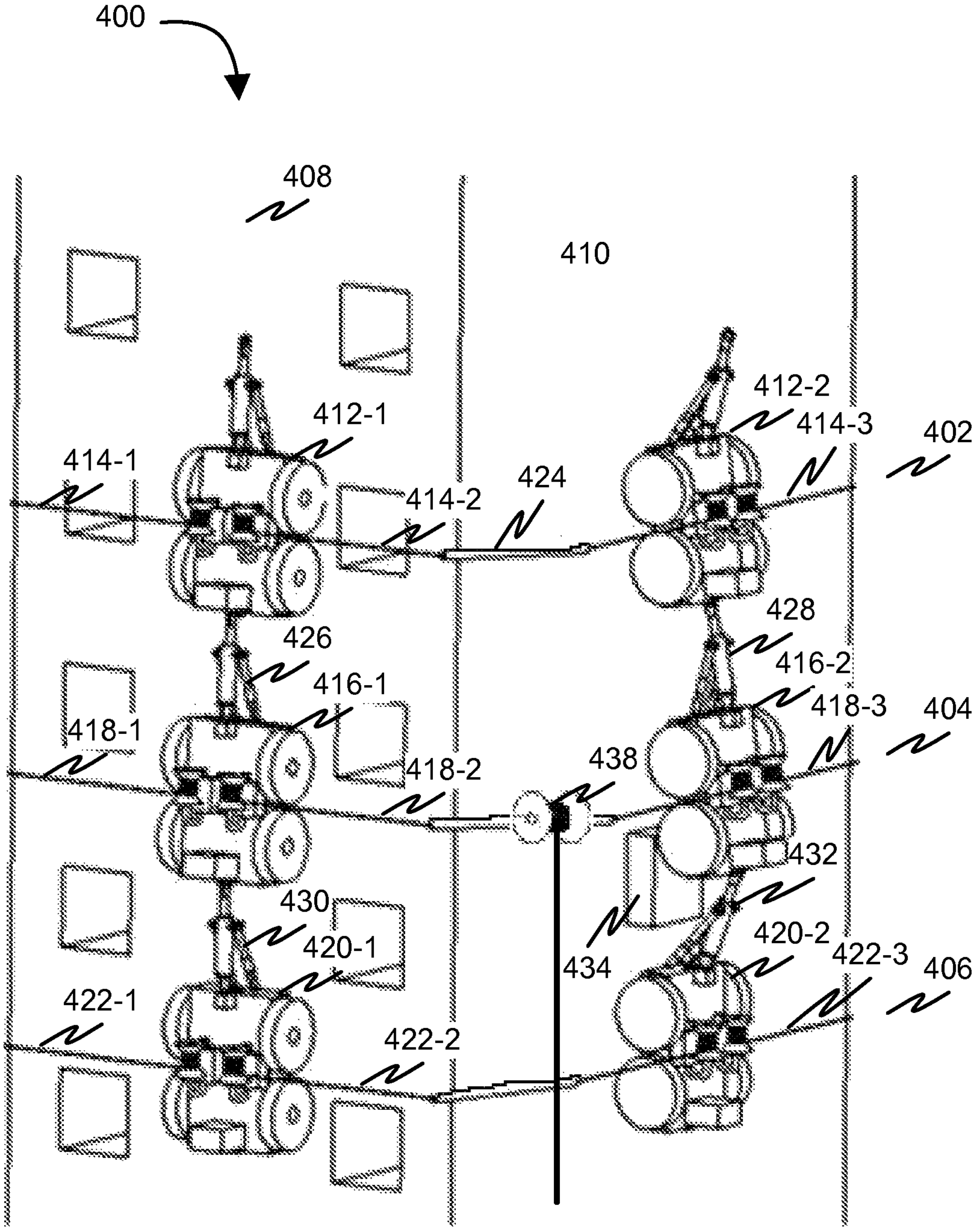
FIG. 4 illustrates an exemplary system for managing operations on a peripheral surface of a building in accordance with an embodiment of the invention.

FIG. 4 illustrates an exemplary system for managing operations on a peripheral surface of a building in accordance with an embodiment of the invention. The system includes one or more cables wrapped around the peripheral surface of the building. The system further includes one or more wheeled devices operatively connected to the one or more cables. The one or more wheeled devices and the one or more cables are capable of moving on the peripheral surface of the building as an assembly. The system illustrated in FIG. 4 includes one or more assemblies. An assembly of the one or more assemblies is operatively connected with an adjacent assembly. For connecting the adjacent assemblies, the system includes one or more hydraulic pumps to operatively connecting a wheeled device of the assembly with a wheeled device of the adjacent assembly.

A hydraulic pump of the one or more hydraulic pumps is configured to angularly move the wheeled device of the assembly away from the peripheral surface of the building with respect to the wheeled device of the adjacent assembly. In order to angularly move the wheeled device of the assembly away from the peripheral surface of the building, one or more wheeled device of the adjacent assembly is tightly positioned on the peripheral surface of the building. The one or more wheeled devices of the adjacent assembly is tightly positioned on the peripheral surface by tightening one or more cables operatively connected to the one or more wheeled devices of the adjacent assembly. To angularly move the wheeled device of the assembly, the wheeled device of the assembly is loosely positioned on the peripheral surface. The wheeled device of the assembly is loosely positioned on the peripheral surface by relaxing the one or more cables operatively connected to the wheeled device of the assembly.

As shown in FIG. 4, system 400 includes an assembly 402, an assembly 404, and an assembly 406 capable of moving on a peripheral surface 408 of a building 410. Peripheral surface 408 may include four sides of building 410. Assembly 402 includes a wheeled device 412-1 operatively connected to a cable 414-1 and a cable 414-2. Assembly 402 includes a wheeled device 412-2 operatively connected to cable 414-2 and a cable 414-3. Further, assembly 404 includes a wheeled device 416-1 operatively connected to a cable 418-1 and a cable 418-2. Assembly 404 also includes a wheeled device 416-2 operatively connected to cable 418-2 and a cable 418-3. Similarly, assembly 406 includes a wheeled device 420-1 operatively connected to a cable 422-1 and a cable 422-2. Assembly 406 includes a wheeled device 420-2 operatively connected to cable 422-2 and a cable 422-3. Cables of an assembly, such as assembly 402, assembly 404, and assembly 406 are wrapped around peripheral surface 408 to securely position wheeled devices of the assembly, such as wheeled device 412-1, wheeled device 412-2, wheeled device 416-1, wheeled device 416-2 wheeled device 420-1, and wheeled device 420-2 on peripheral surface 408. FIG. 4 is shown to include two wheeled devices in each of the three assemblies such as, assembly 402, assembly 404, and assembly 406 for ease of representation in figure. However, it will apparent to a person skilled in the art that in an embodiment, each assembly of the three assemblies may include another two wheeled devices positioned on other two sides of building 410 not shown in FIG. 4.

A portion of a cable staying in contact with edges or corners of peripheral surface 408 is covered with a gripping member. For example, a gripping 424 is positioned on cable 414-2 staying in contact with an edge of building 410. Gripping member 424 may prevent any wear and tear of cable 414-2.

Each assembly of system 400 may be connected to an adjacent assembly. As shown in FIG. 4, assembly 402 is operatively connected to assembly 404. More specifically, assembly 402 is operatively connected to assembly 404 by operatively connecting wheeled device 412-1 and wheeled device 412-2 with wheeled device 416-1 and wheeled device 416-2, respectively. Wheeled device 412-1 is operatively connected with wheeled device 416-1 using a hydraulic pump 426. Similarly, wheeled device 412-2 is operatively connected with wheeled device 416-2 using a hydraulic pump 428. A hydraulic pump for example, hydraulic pump 426 may enable wheeled device 412-1 to angularly move with respect to wheeled device 416-1 and vice versa.

Likewise, assembly 404 is operatively connected to assembly 406. More specifically, assembly 404 is operatively connected to assembly 406 by operatively connecting wheeled device 416-1 and wheeled device 416-2 with wheeled device 420-1 and wheeled device 420-2, respectively. Wheeled device 416-1 is operatively connected with wheeled device 420-1 using a hydraulic pump 430. Similarly, wheeled device 416-2 is operatively connected with wheeled device 420-2 using a hydraulic pump 432.

In an instance, wheeled device 416-2 moving on peripheral surface 408 may face an obstacle 434 situated on peripheral surface 408. In order to overcome obstacle 434, hydraulic pump 432 angularly moves wheeled device 416-2 away from peripheral surface 408 with respect to wheeled device 420-2. The angular movement of wheeled device 416-2 is performed by tightly positioning wheeled device 420-1 and wheeled device 420-2 on peripheral surface 408. Wheeled device 420-1 and wheeled device 420-1 are tightly positioned on peripheral surface 408 by tightening cable 422-1, cable 422-2, and cable 422-3. To angularly move wheeled device 416-2, wheeled device 416-2 is loosely positioned on peripheral surface 408. Wheeled device 416-2 is loosely positioned on peripheral surface 408 by relaxing one of cable 418-1, cable 418-2, and cable 418-3. When wheeled device 416-2 angularly moves, wheeled device 416-2 may overcome obstacle 434 and move forward on peripheral surface 408.

System 400 include a holding member 438 is connected to cable 418-2 in order to hold a rescue cable or a hose. The rescue cable may be used by system 400 for rescuing people from building 410 during any emergency. However, the hose connected to holding member 438 may be used to supply water to different floors for extinguishing fire in building 410 during a fire break out. However, it will be apparent to a person skilled in the art that the holding member connected to a cable may be any other component known in the art for performing firefighting operations, rescue operations, maintenance operations and cleaning operations on the peripheral surface of the building.

Figure 5:
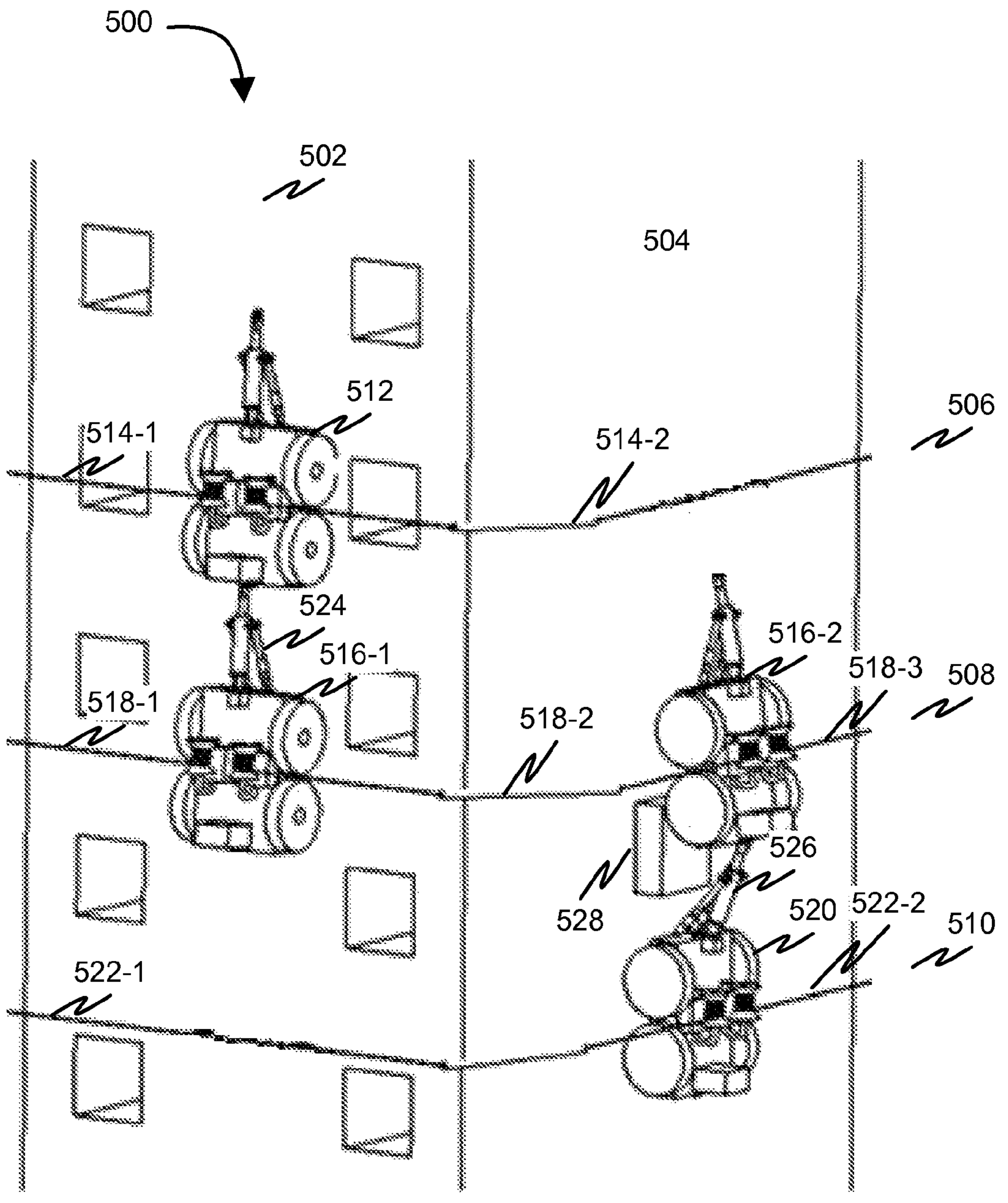
FIG. 5 illustrates a system for managing operations on a peripheral surface of a building in accordance with an embodiment of the invention.

FIG. 5 illustrates a system 500 for managing operations on a peripheral surface 502 of a building 504 in accordance with an embodiment of the invention. As shown in FIG. 5, system 500 includes an assembly 506, an assembly 508, and an assembly 510 capable of moving on peripheral surface 502. Assembly 506 includes a wheeled device 512 operatively connected to a cable 514-1 and a cable 514-2. Further, assembly 508 includes a wheeled device 516-1 operatively connected to a cable 518-1 and a cable 518-2. Assembly 508 also includes a wheeled device 516-2 operatively connected to cable 518-2 and a cable 518-3. Similarly, assembly 510 includes a wheeled device 520 operatively connected to a cable 522-1 and a cable 522-2. Cables of an assembly, such as assembly 506, assembly 508, and assembly 510 are wrapped around peripheral surface 502 to securely position wheeled device 512, wheeled device 516-1, wheeled device 516-2, and wheeled device 520 on peripheral surface 502.

Assembly 506 is connected to assembly 508 by operatively connecting wheeled device 512 with wheeled device 516-1 as shown in FIG. 5. Wheeled device 512 is operatively connected with wheeled device 516-1 using a hydraulic pump 524. Likewise, assembly 508 is operatively connected to assembly 510 by operatively connecting wheeled device 516-2 with wheeled device 520. Wheeled device 516-2 is operatively connected with wheeled device 520 using a hydraulic pump 526.

In an instance, wheeled device 516-2 moving on peripheral surface 502 may face an obstacle 528 situated on peripheral surface 502. In order to overcome obstacle 528, hydraulic pump 526 angularly moves wheeled device 516-2 away from peripheral surface 502 with respect to wheeled device 520. The angular movement of wheeled device 516-2 is performed by tightly positioning wheeled device 520 on peripheral surface 502. Wheeled device 520 is tightly positioned on peripheral surface 502 by tightening cable 522-1 and cable 522-2. To angularly move wheeled device 516-2, wheeled device 516-2 may be loosely positioned on peripheral surface 502. Wheeled device 516-2 is loosely positioned on peripheral surface 502 by relaxing one of cable 518-1, cable 518-2, and cable 518-3.

Figure 6:
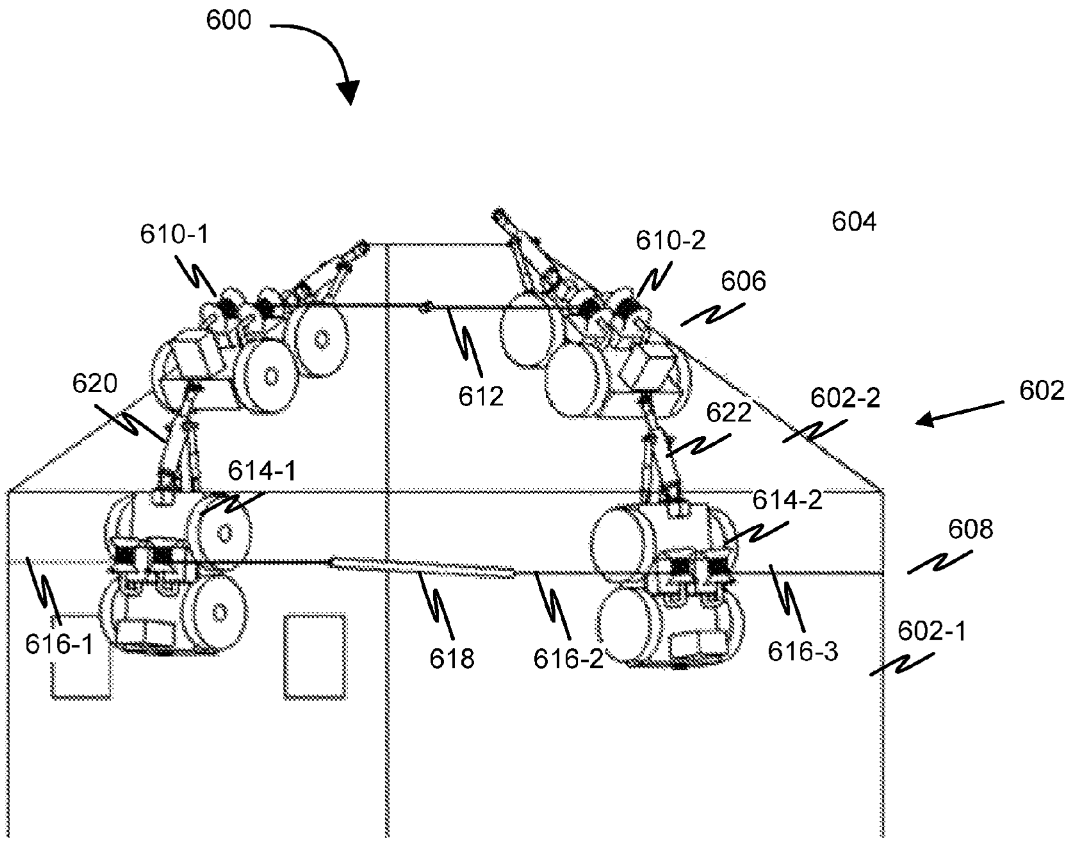
FIG. 6 illustrates a system for managing operations on a peripheral surface of a building in accordance with another embodiment of the invention.

FIG. 6 illustrates a system 600 for managing operations on a peripheral surface 602 of a building 604 in accordance with another embodiment of the invention. As shown in FIG. 6, peripheral surface 602 includes a peripheral surface 602-1 and a peripheral surface 602-2. Peripheral surface 602-2 is at an inclination with respect to peripheral surface 602-1 of building 604. System 600 further includes an assembly 606 and an assembly 608 capable of moving on peripheral surface 602. Assembly 606 includes a wheeled device 610-1 and a wheeled device 610-2 operatively connected to a cable 612. Similarly, assembly 608 includes a wheeled device 614-1 operatively connected to a cable 616-1 and a cable 616-2. Assembly 608 includes a wheeled device 614-2 operatively connected to cable 616-2 and a cable 616-3. Cables of an assembly, such as assembly 606 and assembly 608 are wrapped around peripheral surface 602 to securely position wheeled device 610-1, wheeled device 610-2, wheeled device 614-1, and wheeled device 614-2 on peripheral surface 502. Further, cable 616-2 wrapped around edges or corners of peripheral surface 602 is covered with a gripping member 618. The gripping member is explained in detail in conjunction with FIG. 4.

Assembly 606 is connected to assembly 608 by operatively connecting wheeled device 610-1 and wheeled device 610-2 with wheeled device 614-1 and wheeled device 614-2, respectively as shown in FIG. 6. Wheeled device 610-1 is operatively connected with wheeled device 614-1 using a hydraulic pump 620. Similarly, wheeled device 610-2 is operatively connected with wheeled device 614-2 using a hydraulic pump 622.

While managing operations on building 604, assembly 606 and assembly 608 move in an upward direction on peripheral surface 602-1 of building 604. In an instance assembly 606 may reach peripheral surface 602-2. To enable assembly 606 to move to peripheral surface 602-2, hydraulic pump 620 and hydraulic pump 622 angularly moves with respect to wheeled device 614-1 and wheeled device 614-2. Thus, wheeled device 610-1 and wheeled device 610-2 can conveniently move on inclined peripheral surface 602-2. Hydraulic pump 620 and hydraulic pump 622 are angularly moved by tightly positioning wheeled device 610-1 and wheeled device 610-2 on peripheral surface 602-2. Wheeled device 610-1 and wheeled device 610-2 are tightly positioned by tightening cable 612. The angular movement of wheeled device 610-1 and wheeled device 610-2 is performed by moving hydraulic pump 620 and hydraulic pump 622 towards peripheral surface 602-2. In this instance, wheeled device 614-1 and wheeled device 614-2 are tightly positioned on peripheral surface 602-1. Wheeled device 614-1 and wheeled device 614-2 are tightly positioned on peripheral surface 602-1 by tightening cable 616-1, cable 616-2, and cable 616-3. Further, the movement of assembly 606 on peripheral surface 602-2 is sustained by continuously controlling tension is cable 612.

Figure 7:
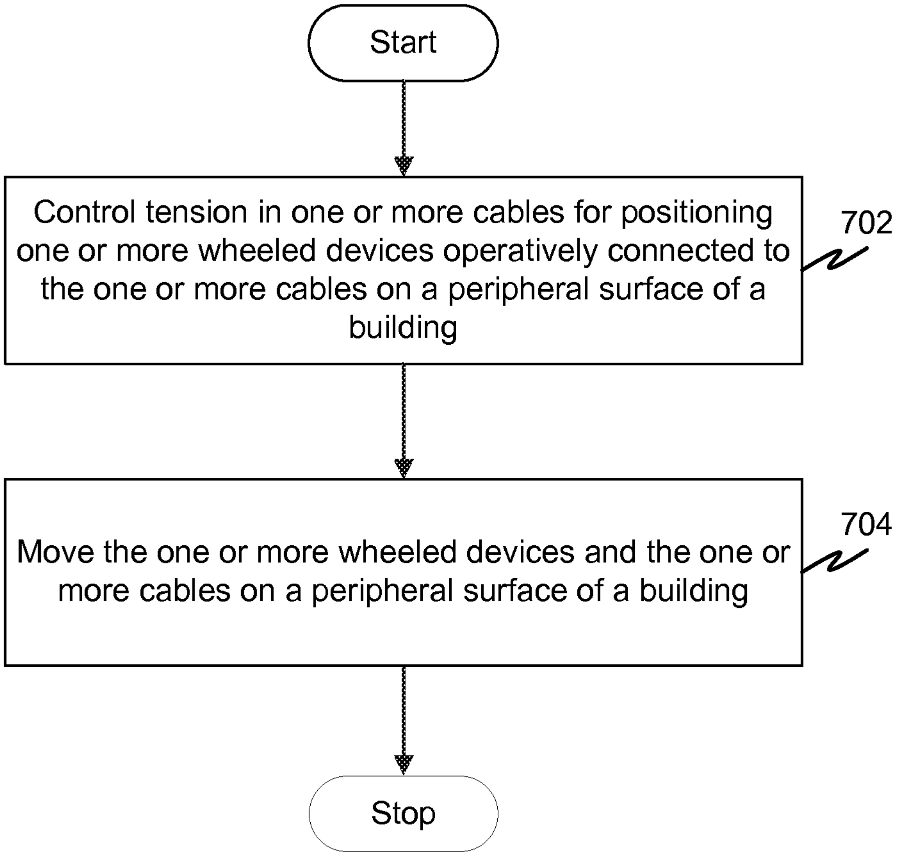
FIG. 7 illustrates a flow diagram of a method for managing operations on a peripheral surface of a building in accordance with various embodiment of the invention.

FIG. 7 illustrates a flow diagram of a method for managing operations on a peripheral surface of a building. To manage the operations on the building, one or more cables may be wrapped around the peripheral surface. Further, one or more wheeled devices may be operatively connected to the one or more cables. The one or more wheeled devices and the one or more cables may move on the peripheral surface as an assembly. In a scenario, one or more instances of the assembly are connected to each other and positioned on the peripheral surface. At step 702, tension in the one or more cables is controlled for positioning the one or more wheeled devices operatively connected to the one or more cables on a peripheral surface of a building. The tension of a cable of the one or more cables is controlled by relaxing and tightening the cable. A wheeled device may include one or more tensioning units for tightening and relaxing cables operatively connected to the wheeled device. This is explained in detail in conjunction with FIG. 2. The relaxing and tightening of the cable is performed in order to loosely position and tightly position a wheeled device of the one or more wheeled device, respectively on the peripheral surface of the building. Thereafter, at step 704, the one or more wheeled device and the one or more cables are moved on the peripheral surface of the building. The wheels of the one or more wheeled devices are controlled using one or more motors. Further, the one or more wheeled device may also be capable of moving multiple directions on the peripheral surface. This is achieved using a steering mechanism present in a wheeled device of the one or more wheeled device. This is explained in detail in conjunction with FIG. 1.

Figure 8:
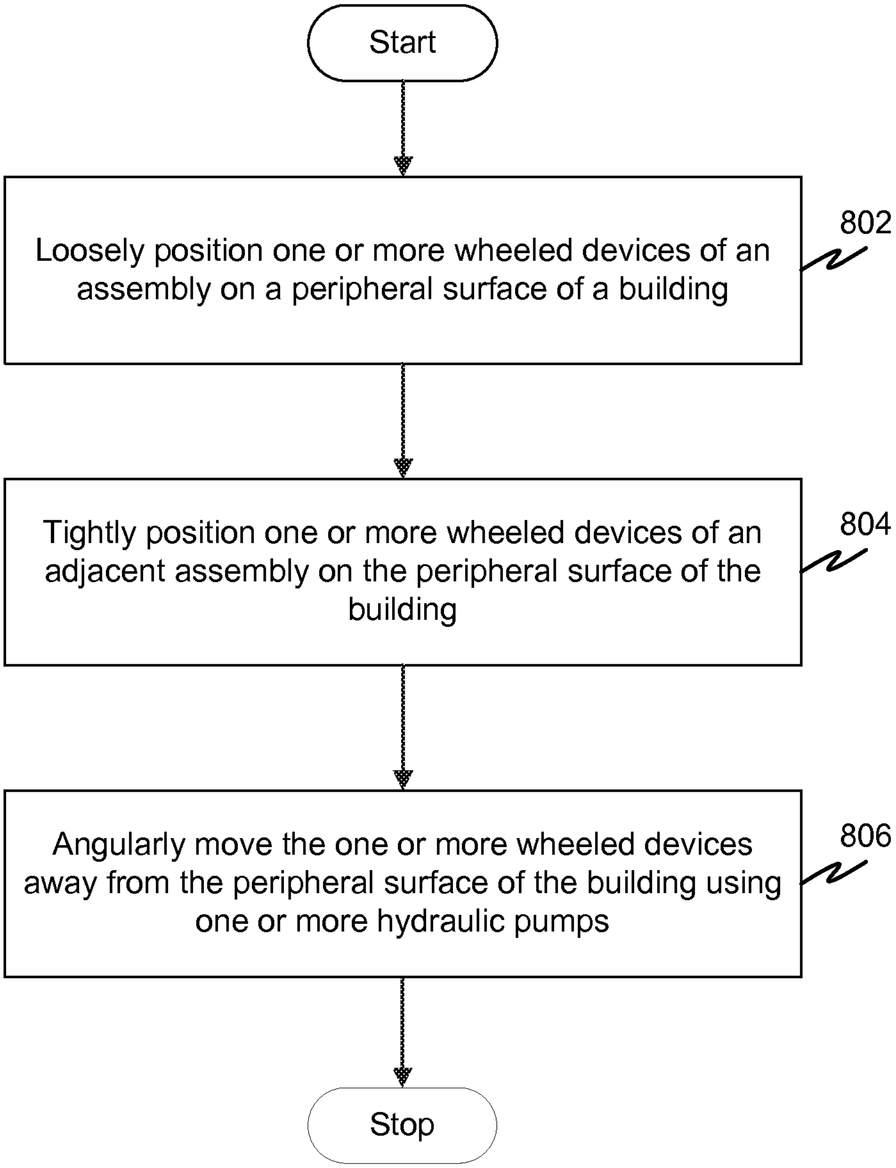
FIG. 8 illustrates a flow diagram of a method for positioning one or more wheeled devices of one or more assemblies on a peripheral surface of a building in accordance with various embodiment of the invention.

FIG. 8 illustrates a flow diagram of a method for positioning one or more wheeled devices of one or more assemblies on a peripheral surface of a building. The one or more wheeled devices may be positioned on the peripheral surface by controlling the tension in the one or more cables connected to the one or more wheeled devices. The one or more wheeled devices along with the one or more cables are capable of moving on the peripheral surface. While moving on the peripheral surface, the one or more wheeled device may face obstacles and may need to move on the peripheral surface having different profile for example, an inclined peripheral surface. In such instance, the one or more cables of the one or more wheeled devices may need to be adjusted to overcome the obstacles and for accommodating the different configurations of the peripheral surface.

At step 802, one or more wheeled devices of an assembly are loosely positioned on the peripheral surface of the building. The one or more wheeled devices are loosely positioned by relaxing a cable of the one or more cables of the assembly. Further, one or more wheeled devices of an adjacent assembly are tightly positioned on the peripheral surface of the building at step 804. The one or more wheeled devices of the adjacent assembly are tightly positioned by tightening a cable of the one or more cables of the adjacent assembly. Thereafter, at step 806, one or more wheeled devices of the assembly are angularly moved away from the peripheral surface of the building. This enables the one or more wheeled devices to overcome the obstacles on the peripheral surface. Further, by tightening and relaxing the one or more cables, the one or more wheeled devices may be capable of accommodating the profile of the peripheral surface. This is explained in conjunction with FIG. 4, FIG. 5 and FIG. 6.

Various embodiments of the invention provide system for managing operations on a peripheral surface of a building. The system efficiently performs rescue, fire fighting, and maintenance operations on high rise buildings. Further, a wheeled device of the system is capable of movement on a peripheral surface of the high rise building. The movement of a wheeled device of the system can be initiated from any storey of a multi-storey building. The system requires minimal manual intervention for managing operations on the peripheral surface of the building. In addition, the system disclosed for managing operations on a peripheral surface of high rise buildings is economical.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A system for managing operations on a vertical peripheral surface of a building, the system comprising:

a first wheeled device;

a cable having a first end and a second end;

a first reel of the first wheeled device directly connected to the first end of the cable;

a second reel of the first wheeled device directly connected to the second end of the cable;

a first motor connected to at least one of the first reel and the second reel for tightening and loosening the cable while the cable is completely wrapped around the vertical peripheral surface of the building; and a second motor connected to at least one wheel of the first wheeled device for moving the first wheeled device along the vertical peripheral surface; and at least one connector directly connected to at least one hydraulic cylinder for coupling the first wheeled device to a second wheeled device while on the vertical surface of the building, the at least one hydraulic cylinder capable of directly connecting to a second connector on the second wheeled device and capable of extending and retracting to vary a distance and angle between the first and second wheeled devices;

wherein the cable can wrap all around the vertical peripheral surface of the building so that when the first reel and the second reel tighten the cable it securely affixes the first wheeled device to prevent movement along the building, and when the first reel and the second reel loosen the cable it provides enough slack to allow the first wheeled device to move vertically along the vertical peripheral surface of the building via the at least one wheel.

2. The system of claim 1, wherein the at least one hydraulic cylinder is configured to angularly move the first wheeled device away from the vertical peripheral surface of the building with respect to the second wheeled device while at least one of said wheeled devices is secured on the building.

3. The system of claim 2, wherein the at least one of said wheeled devices is secured on the vertical peripheral surface of the building is secured by tightening the cable.

4. The system of claim 1 further comprising a holding member coupled with the cable, wherein the holding member is capable of holding one of a rescue cable and a hose.

* * * * *